Figure 1:
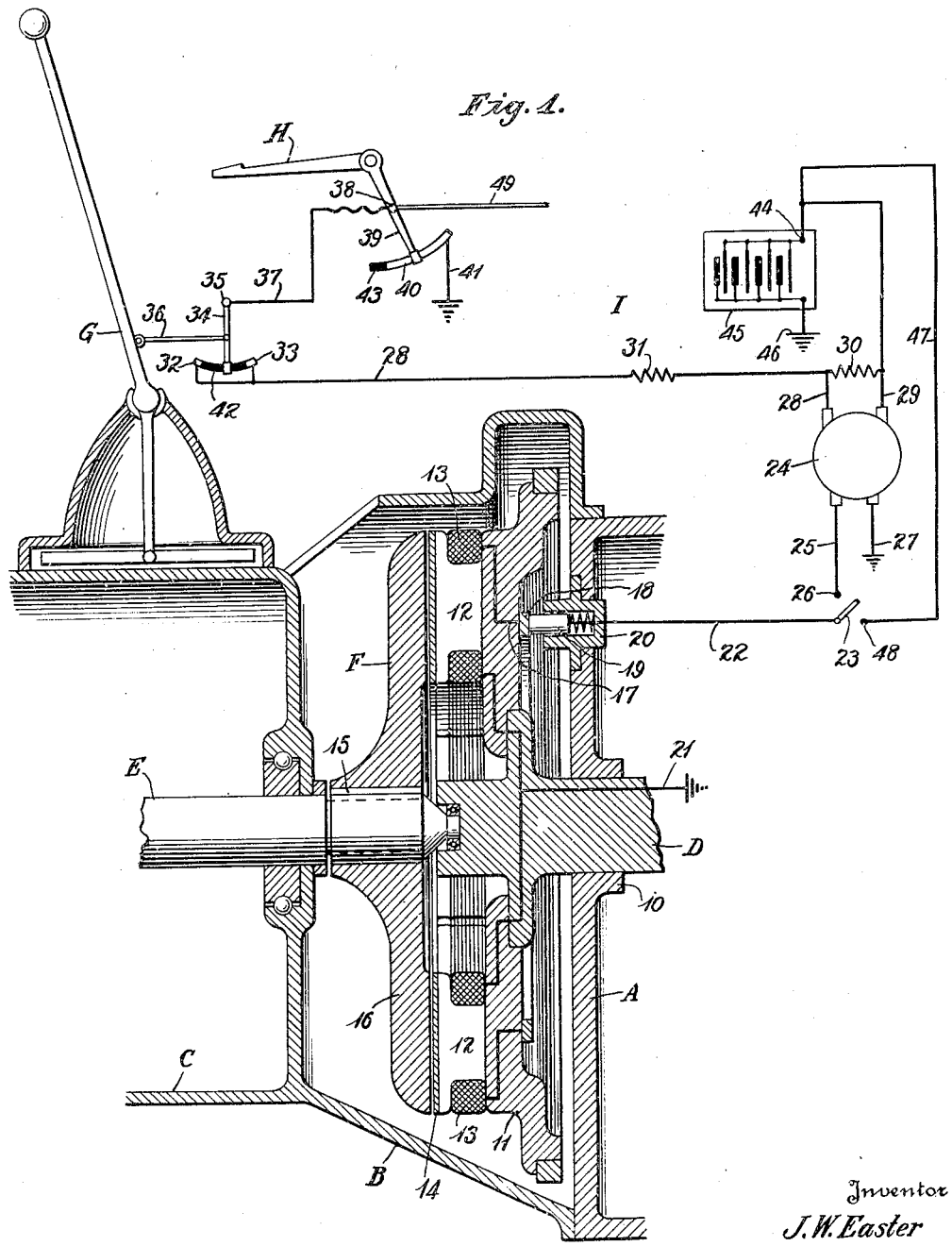

Feb. 6, 1934.  J. W. EASTER  1,946,200

AUTOMATIC ELECTROMAGNETIC CLUTCH AND ELECTRIC COASTING DEVICE

Filed June 17, 1931  2 Sheets-Sheet 1

Inventor
J. W. Easter
By Bacon and Thomas
Attorneys

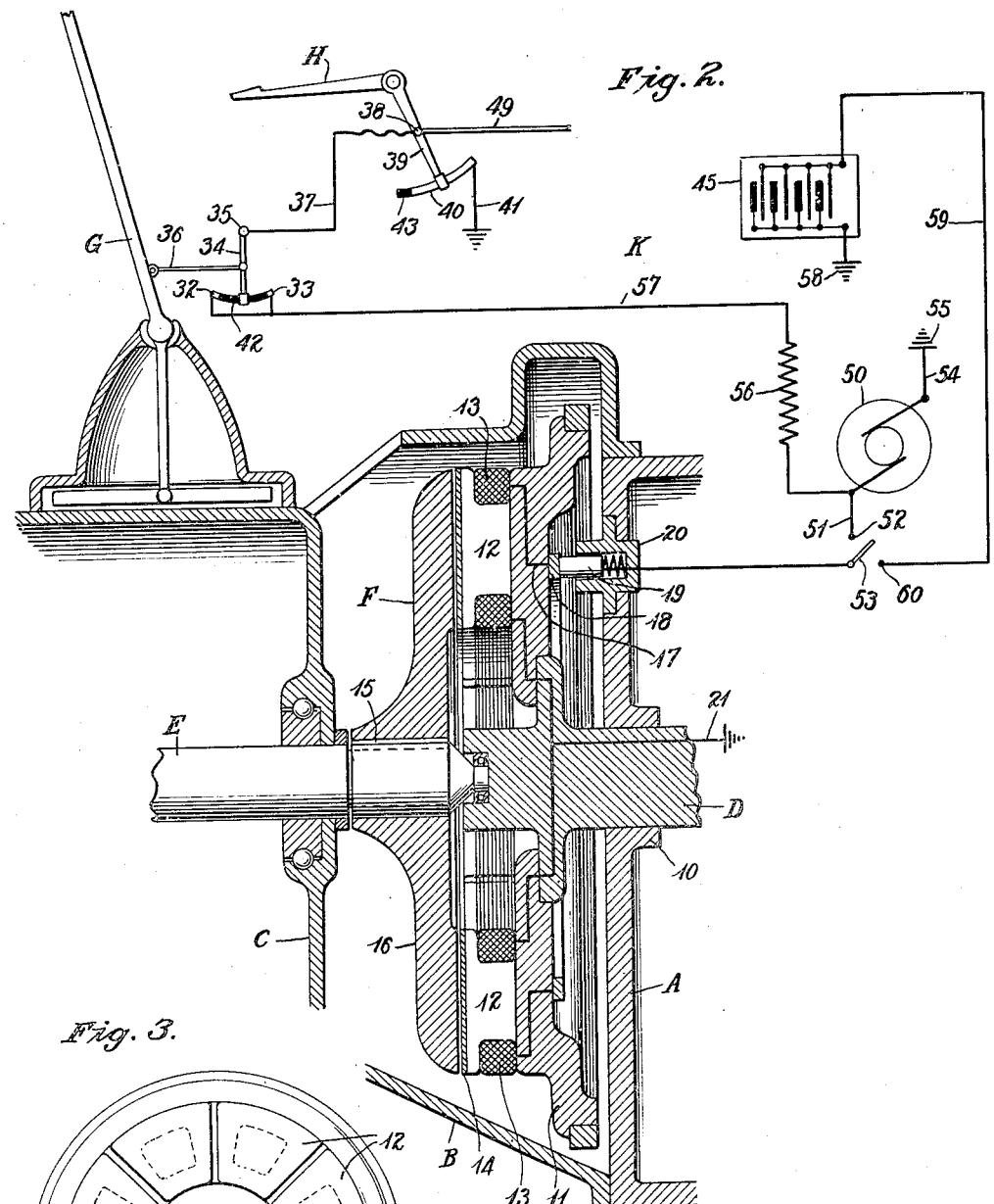
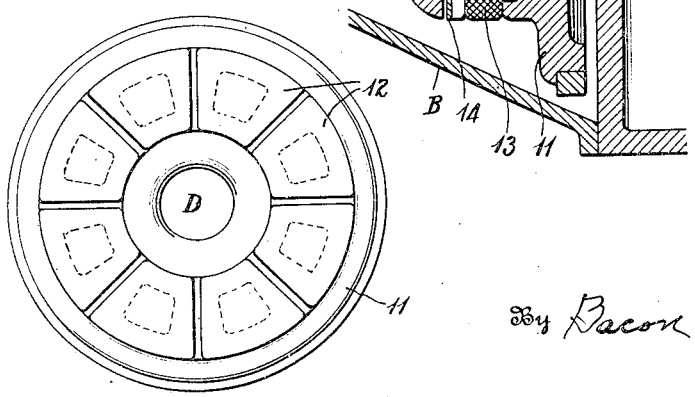

Patented Feb. 6, 1934

1,946,200

UNITED STATES PATENT OFFICE 1,946,200

AUTOMATIC ELECTROMAGNETIC CLUTCH AND ELECTRIC COASTING DEVICE

James W. Easter, Baltimore, Md.

Application June 17, 1931. Serial No. 545,129

8 Claims. (Cl. 192—.01)

This invention relates to new and useful improvements in clutches and deals more specifically with clutches adapted for use in the train of mechanical elements employed for transmitting motion from the power plant to the driving wheels of a motor vehicle.

The primary objection of the invention is to provide a clutch for a motor vehicle which will operate to permit proper or conventional handling of the vehicle without manual manipulation of a clutch control pedal.

Another object of the invention is to provide a motor vehicle clutch which will automatically release when the speed of the power plant is reduced to a point near the stalling point of the motor, thus preventing accidental stalling of the motor when the car reaches a very slow speed or is about to stop with the clutch engaged.

A further object of this invention is to provide a clutch which will operate to permit stopping, starting, free coasting, shifting of gears, and using the compression of an internal combustion engine as a brake without necessitating a manipulation of a clutch control pedal by the operator of a vehicle equipped with this device.

A still further object of the invention is to provide a clutch of the electro-magnetic type with actuating and controlling devices which will permit of proper manipulation of the clutch to accomplish the above mentioned operations with a motor vehicle.

Another object of the invention is to provide a clutch for a motor vehicle which will automatically release upon complete deceleration by means of the conventional foot accelerator pedal and will automatically re-engage upon reacceleration by means of said pedal.

Another object of the invention is to provide a clutch which will automatically release upon shifting of the conventional gear shift lever into its neutral position.

Still another object of the inventon is to provide a clutch for motor vehicles which will automatically and quickly release upon complete deceleration by means of the conventional foot accelerator pedal or upon movement of the conventional gear shift lever to its neutral position and which will automatically re-engage slowly upon re-acceleration and upon shifting of the gear shift lever to any one of its positions which will set the transmission for driving the vehicle.

And still a further object of the invention is to provide a clutch for motor vehicles which will have a rate of engaging movement commensurate with the speed of operation of the power plant of the vehicle at or during the time of reengagement of the clutch.

Another object of the invention is to provide a motor vehicle clutch and suitable controls which will permit or prevent at the will of the operator overrunning of a driven shaft relative to a drive shaft upon deceleration by means of the conventional foot accelerator pedal.

A further object of the invention is to provide a clutch for a motor vehicle which is of exceedingly simple constructon, substantially automatic in its operation, composed of a relatively few number of wearing parts, and one which may be manufactured, installed, and maintained at a relatively low cost.

Other objects and advantages of the invention will be apparent during the course of the following description:

In the accompanying drawings forming a part of this specification and in which like numerals are employed to designate like parts throughout the same, Figure 1 is a vertical sectional view of the clutch structure embodying this invention with electric wiring diagrammatically disclosed and with conventional motor vehicle control devices set forth in elevation, Figure 2 is a similar view to Figure 1 but illustrates a modified form of wiring system, and Figure 3 is a detail elevational view of one element of the clutch.

Broadly stated, the two forms of the invention, illustrated irrespectively in Figures 1 and 2, each includes an internal combustion engine which is represented by the fragmentary portion of the casing A. Secured to this casing is a clutch housing B which has associated with one end thereof a variable speed transmission unit represented by the transmission housing C. The shaft D represents the crank shaft of the engine A. The shaft E represents the drive shaft of the variable speed gearing transmission C. An electro-magnetic clutch F is positioned within the clutch casing B and is employed for connecting and disconnecting the engine shaft D and the transmission shaft E. A conventional gear shift lever G is suitably mounted upon the transmission C while a fuel control foot accelerator pedal H is illustrated without disclosing any specific mounting for the same.

In Figure 1, a wiring system I is electrically connected to the clutch structure F for operating the same and is controlled by switch devices operatively connected to the gear shift lever G and the foot accelerator pedal H. In Figure 2, the wiring system K is connected to and employed for operating the clutch F. This system includes switch devices operatively connected to the gear shift lever G and the foot accelerator pedal H.

For the purpose of completely disclosing the detail features of construction, the two different forms of clutch devices now will be specifically referred to.

First considering Figure 1, we have the engine represented by the casing A with the engine crank shaft D suitably journaled in one end wall thereof by the bearing structure 10. This shaft D has suitably connected thereto a fly-wheel 11 which, as shown in detail in Figure 3, is provided with a plurality of pole pieces 12 arranged in a circular series. Each pole piece has suitably mounted thereon a coil 13 which, when excited, will set up a magnetic field in its respective pole piece. The outer faces of the pole pieces are covered by a friction clutch member 14 which may be composed of any suitable material.

The transmission shaft E has slidably keyed thereto, as by means of the key 15, a soft iron disk 16 which acts as an armature for the pole pieces 12. This clutch disk 16 is keyed to the shaft E to rotate with the latter but is permitted to freely slide axially with respect thereto for frictional driving engagement with the surface covering 14 of the pole pieces when the latter are energized.

The various field coils 13 are connected in parallel and each is provided with a lead 17 which is electrically connected to a collector ring 18. A spring pressed contact brush 19 is mounted in the holder 20 carried by the engine casing A and this brush constantly contacts with the collector ring 18. The second leads for each of the coils 13 are connected to a common ground wire 21. The brush 19 is electrically connected to the wire 22 which extends to the mounting for the movable switch blade 23 and is electrically connected to this blade.

The wiring system I disclosed in Figure 1, includes an electric generator 24 which has an armature output lead 25 extending to a terminal 26 operatively associated with the switch blade 23. The second armature output lead 27 is grounded. The generator is provided with two field leads 28 and 29, respectively. A hot wire shunt resistance element 30 is connected across the field leads 28 and 29. This resistance element possesses the characteristics of having a low resistance when cold and high resistance when heated, a common characteristic of electrical heating unit alloys. The field lead 28 has connected in series therewith a ballast resistance element 31. This lead 28 further extends to the two contact points 32 and 33 for a switch blade 34 which is pivoted at 35 and is connected by a link 36 with the gear shift lever G. A wire 37 extends from the pivot mounting 35 of the switch blade 34 to the point 38 where it is electrically connected with one arm of the foot accelerator pedal H. The arm 39 acts as a switch blade and is electrically associated with the contact 40. The ground connection 41 is provided for this contact 40. An insulating segment or portion 42 separates the two contact points 32 and 33 for the switch blade 34 while an insulating section 43 is associated with the switch contact 40. The second field lead 29 extends to the terminal 44 of the storage battery 45. The second terminal of this battery is grounded as at 46.

A wire 47 extends from the first mentioned terminal 44 of the storage battery 45 to a switch contact point 48 associated with the switch blade 23.

The operation of this clutch with its energizing and controlling system may be described as follows:

The generator 24 is to be driven by any suitable form of mechanical connection with the engine shaft D so that the speed of operation or rotation of the armature for the generator will constantly correspond with the speed of rotation of the engine shaft. The generator will only provide current for energizing the clutch coils 13 when the field of the generator is supplied with current from the battery 45. It is to be understood that the generator 24 may be the battery charging generator of an automobile ignition system. However, if the battery charging generator is to be used, it would have to be modified to take care of the increased load provided by the clutch. For this reason, I prefer to employ a separate generator more specifically designed for this particular work. The battery 45, however, may be the ordinary battery of the automobile ignition system. It will be seen that the switches controlled by the gear shift lever G and the foot accelerator H are interposed in series in the field circuit. The gear shift lever G is illustrated in a position which represents its neutral position; that is, its position where none of the gear trains are set for establishing a drive from the shaft E to the driving wheels of the vehicle. When the gear shift lever is in this position, the switch blade 34 engages the insulated portion 42 interposed between the contact points 32 and 33. When the gear shift lever is moved from its neutral position in either direction to establish a drive through the transmission, the switch blade 34 will engage either one of the contacts 32 or 33 for closing the field circuit at this point. The foot accelerator pedal H is illustrated in a partially depressed position with the switch blade 39 engaging the contact 40. When in this position, the field circuit is closed at this point. When the foot accelerator pedal is released, it will return to its normal off position and the blade 39 then will engage the insulated portion 43 for breaking the circuit to the field at this point. This foot accelerator pedal H is connected by the link 49 to the throttle valve of the carbureter, not shown, for the engine A.

With the foot accelerator pedal depressed for feeding fuel to the engine to accelerate the latter, and with the gear shift lever G positioned to set the transmission C for driving the vehicle, the field of the generator 24 will be supplied with current. The armature of the generator will be rotated, due to the operation of the engine shaft D, and current will be supplied to the clutch coils 13 if the switch blade 23 is positioned in engagement with the contact 26. It is desirable to slowly energize the coils 13 of the clutch so that the clutch disk 16 will smoothly and gradually frictionally engage the friction surface 14 carried by the poles 12 of the fly-wheel 11. To accomplish this smooth, gradual clutching engagement of the elements 14 and 16, the hot wire shunt resistance 30 is connected across the field leads 28 and 29 and the ballast resistance 31 is connected in series in the lead 28. Due to the normally low internal resistance of storage batteries, the ballast resistance 31 is provided so that the voltage or drop across the field leads 28 and 29 initially will not be sufficient to excite the generator field with the result that the normal idling speed of the generator armature will not cause the generator to energize the coils 13 sufficiently to actuate or move the clutch disk 16 into driving engagement with the friction surface 14. Upon closing the field circuit through the switch devices controlled by the gear shift lever G and the foot accelerator pedal H, current will flow through the hot wire shunt 30 and will start heating this element. As this shunt resistance heats, the resistance value of the same will gradually increase with the result that the voltage across the field terminals 28 and 29 will gradually build up. This building up of the field supply will cause the generator to gradually produce more current and will excite the clutch coils 13 in a progressively increasing manner. It is to be understood that the increase in the rate of output of the generator also will be governed by the speed of rotation of the engine shaft D during the engaging operation of the clutch. This type of field circuit for the generator will automatically produce the desired smooth and gradual engagement of the clutch elements for operatively connecting the shafts D and E.

It is to be understood that whenever the gear shift lever G is moved from any of its transmission setting positions into its neutral position, the field circuit will be broken by engagement of the switch blade 34 with the insulated portion 42. It also is to be understood that whenever pressure is removed from the foot accelerator pedal H, the switch blade 39 will be returned to the insulated portion 43 for breaking the field circuit at this point. In view of these facts, the generator field circuit will be broken upon complete deceleration by means of the foot accelerator H and upon shifting of the gear shift lever into its neutral position. The generator 24 will instantly cease developing electricity upon the breaking of the field circuit for the same and the clutch disk 16 will instantly be released from frictional driving engagement with the clutch surface 14 as soon as the generator stops supplying the coils 13 with electricity.

It will be understood from this mode of operation that the operator of the vehicle may provide for free wheeling or coasting by merely decelerating his engine through the medium of the accelerator pedal H. It sometimes is desirable to employ the compression of the engine for braking purposes. This may be accomplished by manually moving the switch blade 23 into engagement with the contact 48. With the blade 23 engaging this contact 48, the coils 13 of the clutch will be placed in circuit with the storage battery 45 and the switch devices controlled by the foot accelerator pedal H and gear shift lever G will no longer control the operation of the clutch. It is to be understood that this switch blade 23 will be located at a convenient point with respect to the operator of the vehicle.

It further will be understood that the clutch elements will be released from frictional driving relation with respect to each other during each movement of the gear shift lever to change the gear ratio of the transmission. In this way, the clutch will automatically operate to disconnect the engine from the transmission during each change of transmission setting.

The form of the invention illustrated in Figure 2 corresponds with the device illustrated in Figure 1 with the exception of certain changes in the generator and wiring system for the same. In view of this fact, the same reference numerals will be applied to the various elements of the electromagnetic clutch and to the various portions of the switches operatively associated with the foot accelerator pedal H and the gear shift lever G. These various corresponding elements will not be described again at this point.

In this form of the invention, we have a generator 50 which is of the shunt wound type and includes a common armature and field lead 51 which is connected to the switch terminal 52 associated with the controllable switch blade 53. The second terminal lead 54 is grounded at 55. The field 56 for the generator is connected by a wire 57 to the terminals 32 and 33 of the switch device controlled by the gear shift lever G.

It will be seen that in this system, the field 56 is not supplied with current by the storage battery 45. In shunt wound generators, there is sufficient residual magnetism in the pole pieces of the generator field for initially exciting the generator. In view of this fact, the mere closing of the field circuit will start the generator supplying electricity to the coils 13 of the clutch. With an ordinary shunt wound generator, therefore, the output will gradually build up from zero to its predetermined maximum when the field circuit is closed and the coils of the clutch will be increasingly energized for causing a smooth, gradual engagement of the clutch elements. The output of this generator, however, will stop practically instantaneously upon breaking its field circuit by proper manipulation of either of the controls G or H.

The storage battery 45 in this system has one terminal grounded, as at 58, and the other terminal is connected by a lead wire 59 to the switch contact 60 associated with the switch blade 53.

The operation of the clutch with the generator and wiring system illustrated in Figure 2 will be substantially the same as the operation of the device illustrated in Figure 1. The principal difference between these two systems of control for the electro-magnetic clutch is in the type of generator employed and the means by which the gradual energization of the clutch coils is accomplished to provide smooth engagement of the clutch elements. When it is desired to drivingly connect the shafts D and E through the clutch for employing the engine as a brake, the switch blade 53 need only be shifted into electrical engagement with the contact 60 and the output of the storage battery 45 will be fed to the clutch coils for energizing the same.

In view of the lengthy description of the operation of the device shown in Figure 1, it is believed to be unnecessary to devote any more space in describing the operation of the system shown in Figure 2.

I purposely have not disclosed a complete engine structure and a complete variable speed gear transmission as any conventional form of engine and transmission may be employed and the disclosing of the same would not aid one skilled in the art in arriving at a better understanding of the invention. I furthermore have refrained from disclosing any mechanical connection between the armatures of the generators and the engine shafts D in those two forms of the invention as any suitable form of connection may be provided and an ordinary mechanic could readily provide the same. It furthermore is believed to be unnecessary to disclose a carbureter and its connection between an engine and the foot accelerator pedal as any conventional form of carbureter and connections may be employed. In using the term "complete deceleration" by means of the convention foot accelerator pedal H, I do not intend to convey the thought that all supply of fuel to the engine will cease. The meaning of this term, as used in this specification, is that the engine will return to its normal idling speed of operation.

It will be seen that with either one of the forms of the invention described herein, the clutch device will automatically disengage upon deceleration for either stopping the vehicle or for permitting free wheeling. The clutch also will automatically disengage for shifting the gears of the transmission. When it is desired to employ the engine as a brake, the operator merely has to move the switch blades 23 in Figure 1 and 53 in Figure 2 to connect the clutch coils directly across the storage battery 45. If the engine should start to stall, for any reason, the speed of rotation of the armatures for the generators will decrease sufficiently to stop the output or supply of electricity to the coils of the clutches. The drive connection between the engines and the transmissions, therefore, will be automatically broken and all load will be removed from the engines with the result that the engine may again pick up or obtain driving speed. With the above explanation, it is believed that any one skilled in the art may arrive at a complete understanding of both of the forms of the invention.

It is to be understood that the forms of this invention herewith shown and described are to be taken as preferred examples of the same, and that various changes in the shape, size, and arrangement of parts, may be resorted to without departing from the spirit of the invention or the scope of the subjoint claims.

Having thus described the invention, I claim:

1. A device of the type described, comprising a drive shaft, a driven shaft, clutch elements on said shafts movable into and out of clutching engagement for connecting and disconnecting said shafts, electrical means for moving said elements into variable degrees of clutching engagement depending upon the amount of current supplied to said electrical means and for releasing said elements from clutching engagement upon termination of said supply, an electric generator having a controllable field circuit, means in said field circuit for varying the current output to cause it to automatically and slowly increase from a predetermined minimum to a predetermined maximum when the field circuit is closed and quickly return to said minimum when said circuit is broken, means for connecting said output to said electrical means, and means for opening and closing said field circuit.

2. A device of the type described, comprising an engine driven shaft, a variable speed transmission shaft, manual engine and transmission controls, a clutch structure for connecting and disconnecting said shafts, power means for operating said clutch structure to slowly connect said shafts and to relatively quickly disconnect said shafts, and means operated by said manual controls for controlling said power means.

3. A device of the type described, comprising an engine driven shaft, a variable speed transmission shaft, manual engine and transmission controls, an electrically operated clutch structure for connecting and disconnecting said shafts, an electric circuit for said clutch structure including controllable means for supplying current to said structure to slowly connect said shafts when said means is rendered operative and to relatively quickly disconnect said shafts when said means is rendered inoperative, and means operated by said manual controls for controlling said current supplying means.

4. A device of the type described, comprising an engine driven shaft, a variable speed transmission shaft, manual engine and transmission controls, clutch elements on said shafts movable into and out of clutching engagement for connecting and disconnecting said shafts, electrical means for moving said elements into variable degrees of clutching engagement depending upon the amount of current supplied to said means, and a source of variable current supply for said electrical means controlled by said manual controls.

5. A device of the type described, comprising an engine driven shaft, a variable speed transmission shaft, manual engine and transmission controls, clutch elements on said shafts movable into and out of clutching engagement for connecting and disconnecting said shafts, electrical means for moving said elements into variable degrees of clutching engagement depending upon the amount of current supplied to said electrical means and for releasing said elements from clutching engagement upon termination of said supply, a controllable source of current supply for said electrical means which will automatically and slowly increase its output of current up to a given maximum when rendered operative and will automatically and quickly stop supplying current when rendered inoperative, and means operated by said manual controls for rendering said source of supply operative and inoperative.

6. A device of the type described, comprising an engine driven shaft, a variable speed transmission shaft, manual engine and transmission controls, clutch elements on said shafts movable into and out of clutching engagement for connecting and disconnecting said shafts, electrical means for moving said elements into variable degrees of clutching engagement depending upon the amount of current supplied to said electrical means and for releasing said elements from clutching engagement upon termination of said supply, an electric generator having a controllable field circuit and a variable current output which automatically and slowly increases from a predetermined minimum to a predetermined maximum when the field circuit is closed and quickly returns to said minimum when the circuit is broken, means for connecting said output to said electrical means and means operated by said manual controls for opening and closing said field circuit.

7. A device of the type described, comprising an engine driven shaft, a variable speed transmission shaft a manual transmission control, an electro-magnetic clutch for connecting and disconnecting said shafts, an electric generator driven by said engine, means for connecting the output of said generator to said clutch, and means operated by said transmission control during its normal use for rendering said generator operative and inoperative to supply the clutch with current.

8. A device of the type described, comprising an engine shaft, a vehicle transmission shaft, a manual control for the transmission shaft, a clutch structure for connecting and disconnecting said shafts, electrical power means for operating said clutch structure to slowly connect said shafts and to permit relatively quick disconnection of said shafts irrespective of the speed of either shaft, and means operated by said control during its normal use for controlling said power means.

JAMES W. EASTER.